May 23, 1939.   W. J. THACKER   2,159,826
ELECTRIC CAPACITOR
Filed July 30, 1936
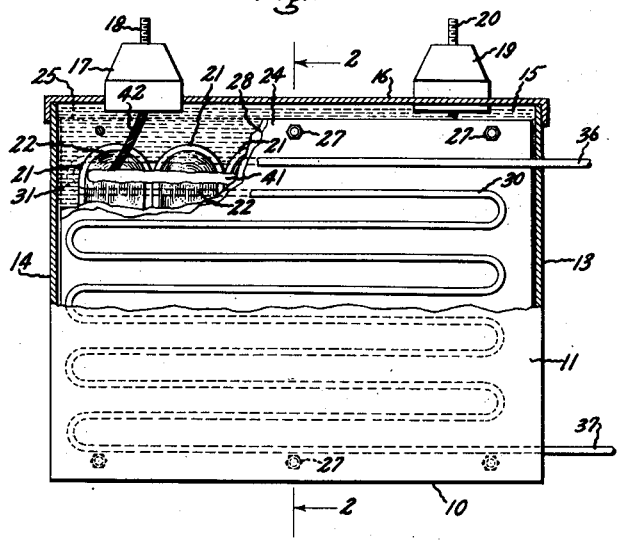
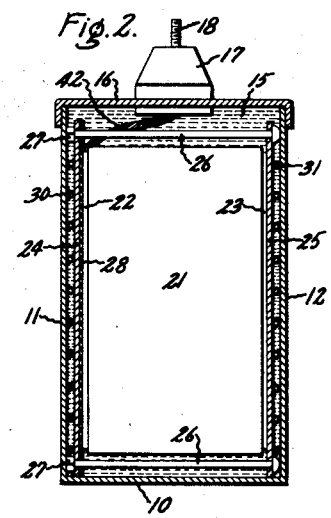
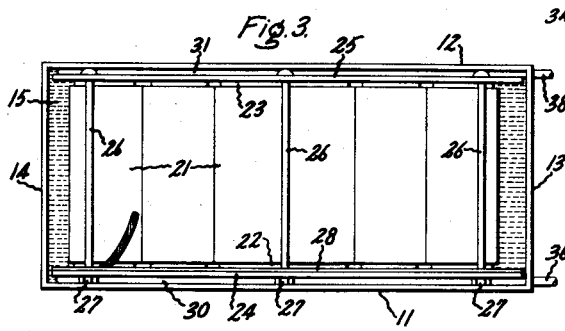
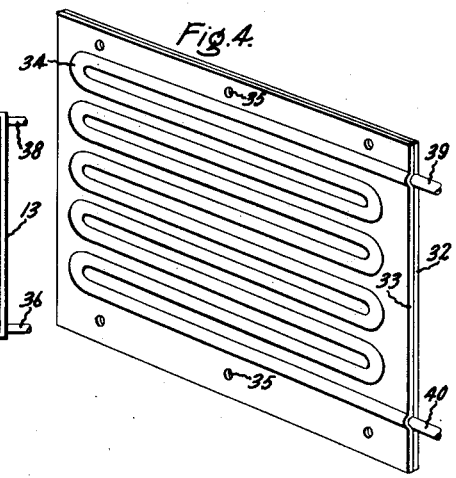
Inventor:
William J. Thacker,
by Harry E. Dunham
His Attorney.

Patented May 23, 1939

2,159,826

UNITED STATES PATENT OFFICE 2,159,826

ELECTRIC CAPACITOR

William J. Thacker, Pittsfield, Mass., assignor to General Electric Company, a corporation of New York Application July 30, 1936, Serial No. 93,394

3 Claims. (Cl. 175—41)

The present invention relates to electric condensers or capacitors and has for a general object the provision of a capacitor having improved construction and arrangement of the elements thereof for obtaining rapid and highly effective dissipation of the heat generated within the capacitor during operation thereof, and which at the same time is simple and economical to manufacture and safe in operation.

A more specific object of the invention is the provision in a capacitor of sturdy, compact, simple and economical heat dissipating means for practicing the invention set forth in the copending application of Merritt E. Scoville, Serial No. 92,620, filed July 25, 1936, and assigned to the assignee of the present invention.

Another object of the invention is the provision of an improved clamping device for an electric capacity body which device serves also as an efficient cooling and heat dissipating structure for the capacity body.

Other objects and the details of the manner of carrying out the present invention will become apparent from the following description taken in conjunction with the accompanying drawing in which Fig. 1 is a front elevation, partially cut away, of a capacitor embodying the present invention; Fig. 2 shows a cross section of the capacitor taken along the line 2—2 of Fig. 1; Fig. 3 is a plan view of the capacitor of Fig. 1 with the top cover removed, and Fig. 4 illustrates a modified form of the invention.

The exemplary form of capacitor illustrated has a metallic enclosing casing or container 10 of rectangular form with two opposite side walls 11 and 12 of greater area than the other two opposite side walls 13 and 14 thereof. This container has a body of electric insulating compound therein which may be a liquid, as designated at 15, such as oil, chlorinated diphenyl or the like, or may be if desired some other suitable form of insulating compound. A cover 16 closes the top of the container. A bushing 17 is supported by the cover and serves to support a terminal 18 passing therethrough. For reasons to be pointed out hereinafter there may be provided also a second bushing 19 and terminal 20 carried by the cover.

Within the casing or container 10 and immersed in the liquid 15 are assembled a plurality of electric capacity units 21 which may be of the stack type but which in the exemplary embodiment illustrated are of the flattened roll type well known in the art and each comprising metallic foil armature elements wound with one or more spacing strips of insulating material such as fabric or paper interleaved therebetween and with alternate foils displaced in opposite directions with respect to the spacing material so that marginal edges of alternate foils, designated respectively as 22 and 23, project beyond the edges of the spacing material at opposite ends respectively of the rolls as best shown in Fig. 2.

The plurality of capacity units are assembled in side by side relationship and clamped in a compact body by means of a clamping device comprising a pair of improved metal bearing plates 24 and 25 disposed respectively on the opposite exposed foil edge 22 and 23 sides of the capacity body and clamping bolts 26 and nuts 27 for drawing the plates tightly against the body. In order to prevent short circuiting of the capacity units, it is necessary that the exposed foil edges on at least one side of the assembly be electrically insulated from the clamping device and the metallic enclosing container. In the embodiment illustrated, this is accomplished by the insertion of a sheet 28 of electric insulating material between the foil edges 22 and the adjacent plate 24. However, it will be understood that in some cases, depending upon the method of electric connection employed as will be discussed hereinafter, it may be desired to insert sheets of insulation between the foil edges and the respectively adjacent bearing plates on both sides of the assembly. It is desirable that the electric insulation sheet be of reasonably good thermal conductivity material. Moreover, the bearing plates also should be constructed of metal having high thermal conductivity.

In the practice of the present invention, the plates 24 and 25 are constructed to serve not only as the bearing or compression plates of a clamping device but also as heat transfer and cooling devices for the assembled body of capacity units. To this end the plates are provided with means forming passages or conduits for the circulation of cooling medium in efficient heat exchange relation with the plates and with the adjacent exposed foil edges of the capacity body. In the embodiment of the invention illustrated in Figs. 1 to 3 inclusive, the passages are formed by means of lengths of metal tubing 30 and 31 wound in zigzag or sinuous form and rigidly affixed to the outside surfaces of the plates 24 and 25 respectively. A modified form of bearing plate embodying the present invention is illustrated in Fig. 4 wherein a heat transfer plate 32, corresponding to the plates 24 and 25 of the first embodiment, has rigidly affixed thereto by welding or other suitable means a second plate 33 punched or pressed in any suitable manner to provide an inwardly facing zigzag depression or groove 34 which cooperates with the inner surface of the plate 32 to form a sinuous cooling medium circulation passage. It will be obvious, of course, that the plate 32 also may be punched or pressed to form a zigzag groove for cooperation with the groove 34 of plate 33 or, if desired, a single plate, corresponding to the two plates 32 and 33, may be cast in any suitable manner to provide a sinuous passage interiorly thereof. Holes 35 are provided in the plates 32 and 33 for the accommodation of the clamping bolts 26. It is, of course, necessary to make provision for supplying cooling medium to the passages of the bearing plates and in the case of the embodiment illustrated in Figs. 1 to 3 inclusive this is effected by providing extensions at opposite ends of the lengths of tubing 30 and 31 which extensions are brought out through a wall of the enclosing container, as indicated at 36, 37 and 38 in Figs. 1 and 3, for the connection of a cooling medium supply thereto in any suitable manner. In the case of the embodiment illustrated in Fig. 4, short lengths of tubing 39 and 40 are inserted in the opposite ends of the passage formed by the groove 34 and these lengths of tubing are caused to project through openings in a wall of the enclosing container. Provision for effecting the connections to a cooling medium supply may, however, be made in other ways than those illustrated and it will be understood that the invention is not limited by the precise method of making the connections.

The actual electrical grouping and connections of the capacity rolls 21 is immaterial to the practice of the present invention and they may be grouped and connected in any well known manner as, for example, in a plurality of groups of parallel connected rolls with the groups connected in series, or with all of the rolls connected in parallel by means of conductors or buses, such as that designated 41 in Fig. 1, secured in any suitable manner, as by soldering, to the exposed foil edges on the opposite sides of the assembled body of rolls. In the illustrated embodiment the conductor or bus 41 which is in contact with the exposed foil edges 22 is connected by means of a lead 42 to the terminal 18. The exposed foil edges 23, since they are in direct contact with the metallic heat transfer plate 25, are in electrical conductive relation to the metallic enclosing casing 10 which may be connected to the terminal 20 or which may be connected directly in an electric circuit in any other suitable well known manner. In case, as previously suggested, it is desired to insulate the exposed foil edges 23 also from the metal clamping device and metal enclosing casing, these foil edges are then connected in a manner similar to that of the exposed foil edges 22 to the terminal 20.

With the assemblies and constructions hereinbefore described, the bearing plates may, by means of the bolts 26 and nuts 27, be drawn into very efficient heat exchange relation with the exposed foil edges of the capacity body. The pressure of the plates against the body tends to flatten out the foil edges so that they form substantially continuous heat transfer surfaces of large area, and the firm bearing of the plates against the sides of the capacity body results in effective conduct of the heat from the foil edges to the broad heat transfer surfaces of the plates. Thus paths are formed for the transfer of heat from the interior of the capacity body to the heat dissipating structure provided by the bearing plates which paths extend through and parallel to the foil layers themselves, are of minimum length and maximum area with respect to the dimensions of the foils and are entirely through solid material which is for the most part comprised of the highly thermal conductive metal of the foils and the heat transfer plates. These paths are entirely free of any gaps of liquid or gas or unnecessary poor thermal conductivity material. In an assembly such as the one illustrated in which the exposed foil edges on one side of the capacity body are in direct contact with the adjacent combined clamping and heat dissipating plate of the clamping device, the conduction of the heat from the interior of the body to the plate is of course a maximum for a given temperature gradient between the interior of the body and the plate. However, the introduction where necessary of a sheet of electrical insulation material between the foil edges and the heat transfer surface of the plate has been found not to reduce materially the effectiveness of the heat transfer by conduction from the foil edges to the plate provided insulation material of reasonably good thermal conductivity is employed since the heat transfer paths still extend entirely through solid material and the foil edges are in close and efficient thermal conductive proximity to the heat transfer plates. The circulation of cooling medium through the passages provided by the tubings 30 and 31 in the one case and the grooves 34 in the other case in close heat exchange relation with the heat transfer surfaces of the bearing plates results in rapid and efficient carrying away of the heat generated within the capacity body during operation thereof.

What I claim is new and desire to secure by Letters Patent of the United States:

1. In a capacitor including an enclosing container, an electric capacity body disposed in said container and including interleaved layers of conductive foil and spacing material, a clamping device for said body comprising a pair of metal plates and clamping means associated therewith securing the plates respectively in firm engagement with two opposite sides of said body, said body with its said clamping device forming a unitary assembly independent of said container for installation as a unit wholly within the container, said plates having extensive area of engagement with said sides of said body and each of said plates having means fixedly associated therewith providing a conduit for circulation of cooling medium in heat exchange relation to the plate, and means providing for connection of said conduits with a cooling medium supply external of said container.

2. In a capacitor including an enclosing container, a plurality of capacity units in said container each comprised of interleaved conductive foil and spacing material, means clamping said units together in compact contacting juxtaposed relationship to form a unitary capacity body, said clamping means including a pair of heat conductive clamping elements respectively disposed on two opposite sides of said body and tie elements extending between said clamping elements to hold the latter in clamping engagement with said opposite sides of said body, said body and its said clamping means forming a unitary assembly independent of said container for installation as a unit wholly within the container, said clamping elements having extensive surfaces in contact with said sides of said body and having cooling medium circulation conduits, and means extending from said conduits to the exterior of said container for connection with a source of cooling medium external of the container.

3. In a capacitor including an enclosing container having liquid insulating medium therein, a plurality of flattened roll type capacity units immersed in said medium and each including interleaved foil and spacing material assembled with edges of opposite potential foils exposed respectively at opposite ends of the rolls, means clamping said rolls in a compact body with the rolls in contacting side by side juxtaposition and the exposed foil edge ends of the rolls collectively forming two substantially continuous opposite sides of said body, said clamping means comprising a pair of metal plates disposed respectively in extensive solid thermal conductive relation with the exposed foil edges on said two opposite sides of said body and tie rods extending between the plates to draw the plates into tight clamping engagement with said two sides, said body with its said clamping means forming a unitary assembly independent of said container for installation as a unit wholly within the casing and said plates each having cooling medium circulation conduit means fixedly associated therewith, and means providing for connection of said conduit means with a supply of cooling medium external of the container.

WILLIAM J. THACKER.